United States Patent
Ow et al.

(10) Patent No.: US 9,208,805 B1
(45) Date of Patent: Dec. 8, 2015

(54) METHOD FOR EVALUATING BIT ERROR RATE FOR A MAGNETIC HEAD BY USING A QUASI-STATIC TEST SYSTEM, AND SYSTEM THEREOF

(71) Applicant: SAE Magnetics (H.K.) Ltd., Hong Kong (CN)

(72) Inventors: Wai Bun Ow, Hong Kong (CN); Ho Kei Lam, Hong Kong (CN); Cheuk Man Lui, Hong Kong (CN); Kai Chiu Cheung, Hong Kong (CN); Yuk Sing Lo, Hong Kong (CN); Wah Chun Chan, Hong Kong (CN); Juren Ding, Hong Kong (CN)

(73) Assignee: SAE Magnetics (H.K) Ltd., Hong Kong (CN)

( * ) Notice: Subject to any disclaimer, the term of this patent is extended or adjusted under 35 U.S.C. 154(b) by 0 days.

(21) Appl. No.: 14/584,072

(22) Filed: Dec. 29, 2014

(51) Int. Cl.
| | |
|---|---|
| *G11B 27/36* | (2006.01) |
| *G11B 5/10* | (2006.01) |
| *G11B 5/455* | (2006.01) |
| *G11B 20/18* | (2006.01) |
| *G11B 20/10* | (2006.01) |
| *G11B 20/12* | (2006.01) |
| *G01R 33/12* | (2006.01) |

(52) U.S. Cl.
CPC .......... *G11B 5/455* (2013.01); *G11B 20/10388* (2013.01); *G11B 20/1252* (2013.01); *G11B 20/182* (2013.01); *G11B 2020/1291* (2013.01)

(58) Field of Classification Search
CPC ...... G11B 5/012; G11B 27/36; G11B 5/3133; G11B 5/3116; G11B 5/6005; G11B 5/6065; G11B 5/1278; G11B 5/455
USPC ......... 360/31, 123.12, 125.31, 128, 319, 313, 360/59; 324/210; 428/816
See application file for complete search history.

(56) References Cited

U.S. PATENT DOCUMENTS 8,810,962 B2 * 8/2014 Wu et al. .............. G11B 5/1278
360/123.12

* cited by examiner

*Primary Examiner* — Nabil Hindi
(74) *Attorney, Agent, or Firm* — Nixon & Vanderhye PC

(57) ABSTRACT

A method for evaluating bit error rate for a magnetic head by using a quasi-static test system, includes step (a), measuring a noise characteristic curve for a magnetic head, and the noise characteristic comprising noise amplitude and maximum noise amplitude; step (b), constructing a noise waveform by appropriately scaling a signal noise ratio of the magnetic head based on the noise characteristic curve measured in step (a); and step (c), injecting the noise waveform constructed in step (b) into a model comprising a transmitter module and a receiver module to evaluate a bit error rate. The method saves testing time, reduces manpower, and obtains accuracy testing result.

11 Claims, 4 Drawing Sheets

METHOD FOR EVALUATING BIT ERROR RATE FOR A MAGNETIC HEAD BY USING A QUASI-STATIC TEST SYSTEM, AND SYSTEM THEREOF

FIELD OF THE INVENTION

The present invention relates to a quasi-static test (QST) system and a method for evaluating bit error rate (BER) for a magnetic head, and more particularly to a system and method for evaluating BER by injecting noise with appropriate level.

BACKGROUND OF THE INVENTION

Hard disk drive incorporating rotating magnetic disks is commonly used for storing data in the magnetic media formed on the disk surfaces, and a movable head are generally used to read data from and write date into tracks on the disk surfaces.

It's typical to test the hard disk drive during manufacturing both to reject defective devices and to adjust device parameters to improve operation. This process may include, for example, writing and reading data patterns from a storage medium associated with the device. BER typically forms an important performance criterion during testing or operation of the magnetic head. Simply, BER test is a testing tool which is used to determine the magnetic head performance by writing the data pattern to the storage medium and reading the data pattern for code comparison. A remarkable BER will be served as a critical factor to reject the magnetic head which should be improved or repaired.

A conventional BER test is performed under a DET testing platform which simulates dynamic performance of the hard disk drive, for example, the flying performance, the reading and writing performance of the magnetic head, to evaluate the accuracy BER. However, this test method must be carried out in slider level, that is, the sliders are tested one by one, which costs abundant time and a great deal of manpower.

Hence, it is desired to provide an improved method and system for evaluating BER for a magnetic head to overcome the above-mentioned drawbacks.

SUMMARY OF THE INVENTION

One objective of the present invention is to provide a method for evaluating bit error rate in a magnetic head by using a quasi-static test (QST) system, which saves testing time, reduces manpower, and obtains accuracy testing result.

Another objective of the present invention is to provide a QST system which saves testing time, reduces manpower, and obtains accuracy testing result.

To achieve the above objectives, a method for evaluating bit error rate for a magnetic head by using a quasi-static test system, includes:

step (a), measuring a noise characteristic curve for a magnetic head, and the noise characteristic comprising noise amplitude and maximum noise amplitude;

step (b), constructing a noise waveform by appropriately scaling a signal noise ratio of the magnetic head based on the noise characteristic curve measured in step (a); and step (c), injecting the noise waveform constructed in step (b) into a model comprising a transmitter module and a receiver module to evaluate a bit error rate.

As a preferred embodiment, the step (b) includes:

capturing and normalizing an initiate noise waveform of the magnetic head with a digital storage oscilloscope; and adjusting the initiate noise waveform by scaling the signal noise ratio of the magnetic head based on the noise characteristic curve, to obtain the noise waveform.

Preferably, the scaling for the noise waveform is calculated according to the equation below:

$$\text{Target\_Amp} = \frac{\text{Model\_Data\_Amp}}{SNR} \times \text{Optimization\_Gain},$$

wherein the Model_Data_Amp designates the amplitude of the model, the Optimization_Gain designates a constant.

As another preferred embodiment, the step (c) includes:

simulating an operation of the model by injecting the noise waveform into the model;

determining actual bit errors of the model when the model is simulated with the noise waveform; and evaluating the bit error rate based on the actual bit errors.

Preferably, said determining the actual bit errors further includes:

receiving a pseudorandom binary sequence of data generated by a digital storage oscilloscope;

receiving an output from the receiver module of the model into which the pseudorandom binary sequence of data and the noise waveform are injected;

comparing the pseudorandom binary sequence of data and the output received from the receiver module; and determining the actual bit errors based on said comparing.

Preferably, said simulating the operation of the model further includes:

receiving a pseudorandom binary sequence of data in the transmitter module of the model;

injecting the noise waveform; and receiving the pseudorandom binary sequence of data, with the noise waveform, in the receiver module.

Accordingly, a quasi-static test system includes:

a measuring device configured to measure a noise characteristic curve for a magnetic head, and the noise characteristic curve comprising noise amplitude and maximum noise amplitude;

a noise waveform generator configured to construct a noise waveform;

an adjustment unit configured to adjust the noise waveform by appropriately scaling the noise waveform based on a signal noise ratio of the magnetic head calculated according to the noise characteristic curve;

a model comprising a transmitter module and a receiver module;

a noise injection module configured to inject the noise waveform into the model; and a bit error rate analyzer coupled with the model and configured to evaluate a bit error rate.

Preferably, the noise waveform generator includes a digital storage oscilloscope configured to capture and normalize an initiate noise waveform of the magnetic head, and the adjustment unit configured to adjust the initiate noised waveform by scaling the signal noise ratio of the magnetic head to obtain the noise waveform.

Preferably, the scaling for the noise waveform is calculated according to the equation below:

$$\text{Target\_Amp} = \frac{\text{Model\_Data\_Amp}}{SNR} \times \text{Optimization\_Gain},$$

wherein the Model_Data_Amp designates the amplitude of the model, the Optimization_Gain designates a constant.

Preferably, the bit error rate analyzer is further configured to simulate an operation of the model by injecting the noise waveform into the model; determine actual bit errors of the model when the model is simulated with the noise waveform; and evaluate the bit error rate based on the actual bit errors.

Preferably, the bit error rate analyzer is further configured to receive a pseudorandom binary sequence of data, to receive an output from the receiver module into which the pseudorandom binary sequence of data and the noise waveform are injected, to compare the pseudorandom binary sequence of data and the output received from the receiver module, and to determine the actual bit errors based on the comparison.

In comparison with the prior art, the BER testing tool of the present invention is combined with the QST tester, that is, the BER evaluation is performed in the QST system, which saves testing time and brings accurate testing result at the same time. Additionally, this testing method and system is also applicable to the row bar level, instead of testing the magnetic head one by one, which reduces manpower and improves the testing efficiency accordingly.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
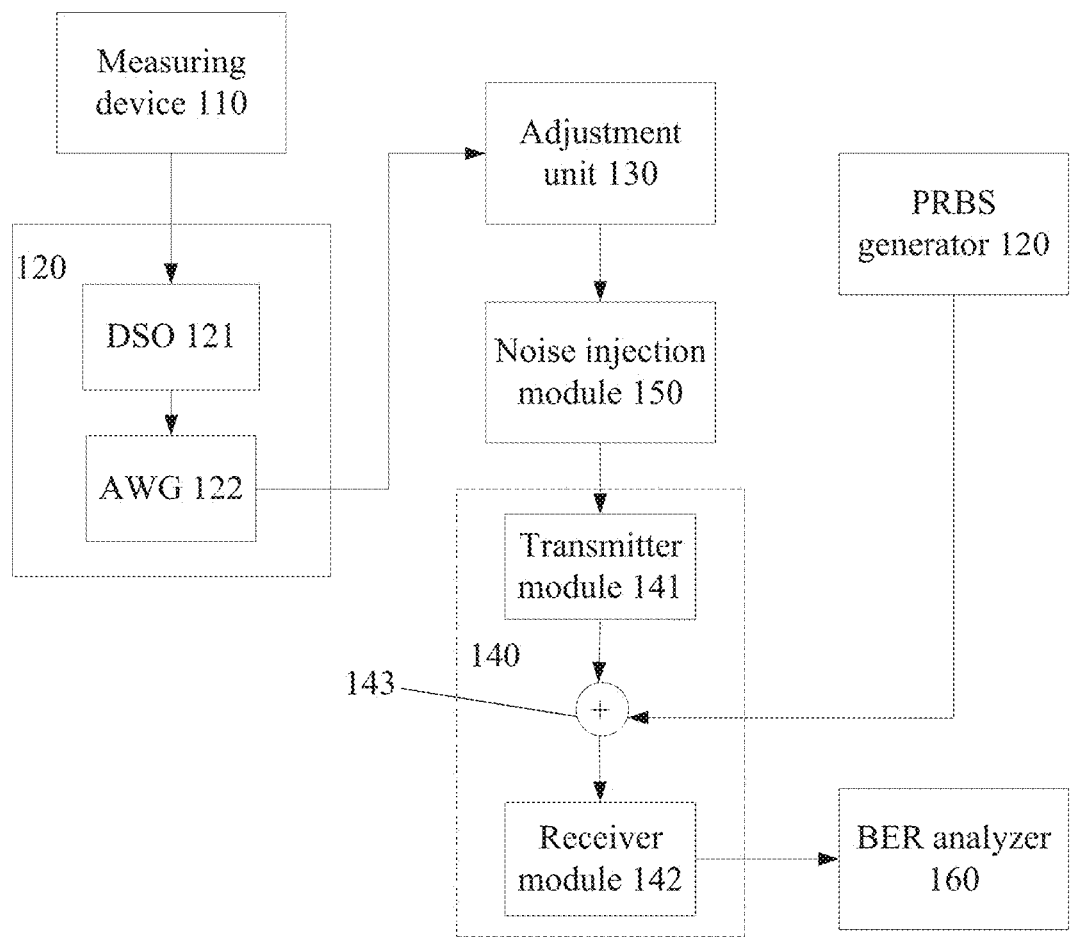
FIG. 1 shows a QST system according to one embodiment of the present invention.

Various preferred embodiments of the invention will now be described with reference to the figures, wherein like reference numerals designate similar parts throughout the various views. As indicated above, the invention is directed to a method for evaluating bit error rate in a magnetic head by using a QST system, and a QST system thereof, which saves testing time, reduces manpower, and obtains accuracy testing result.

FIG. 1 schematically illustrates a QST system for evaluating BER for magnetic heads, according to the present invention. The QST system 100 includes a measuring device 110 configured to measure a noise characteristic curve for a magnetic head, a noise waveform generator 120 configured to construct a noise waveform, an adjustment unit 130 configured to adjust the noise waveform by appropriately scaling a signal noise ratio of the magnetic head based on the noise characteristic curve.

The measuring device 110 is a common portion in the QST system 100, which includes a magnetic field provider for providing desired magnetic field to the magnetic head and a measuring tool configured to observe the output curve of the magnetic head under the changed magnetic field. Alternatively, the measuring device 110 may includes other testing condition provider such as temperature, frequency, electrical current, which may impact the output of the magnetic head to reflect its noise characteristic. In this embodiment, the noise characteristic curve measured by the measuring device 110 includes noise amplitude curve, maximum noise amplitude curve, and noise root mean square (RMS) curve for example, by which signal noise ratio (SNR) of the tested magnetic head is reflected thereon and can be evaluated therefrom.

The noise waveform generator 120 is a pseudorandom binary sequence (PRBS) generator that includes a digital storage oscilloscope (DSO) 121 and an arbitrary waveform generator (AWG) 122 and is configured to capture digitized noise waveform and convert into a pseudorandom sequence of binary bits of data.

The adjustment unit 130 is configured to adjust the noise waveform by appropriately scaling based on a signal noise ratio of the magnetic head calculated from the noise characteristic curve, and the scaling for the noised waveform is performed according to the equation below:

$$\text{Target\_Amp} = \frac{\text{Model\_Data\_Amp}}{SNR} \times \text{Optimization\_Gain},$$

and the Model_Data_Amp designates the amplitude of the model, the Optimization_Gain designates a constant.

In the embodiment seen in FIG. 1, the system 100 further includes a model 140 including a transmitter module 141 and a receiver module 142; a noise injection module 150 configured to inject the noise waveform into the model 140; and a bit error rate (BER) analyzer 160 coupled with the model 140 and configured to evaluate a bit error rate.

The model 140 also includes an interconnect module 143. The interconnect module 143 models an interconnection of the actual testing system, interconnecting the transmitter module 141 and the receiver module 142. In an embodiment of the disclosure, the interconnect module 143 suitably corresponds to a wired interconnect, such as a connection board.

The noise injection module 150 is illustrated to inject noise in the model 140 between the interconnect module 143 and the receiver module 142.

In an embodiment, the BER analyzer 160 is coupled to the model 140. Specifically, while simulating an operation of the QST system 100, the BER analyzer 160 analyzes and determines actual bit errors occurring during the simulation of the QST system 100. Specifically, the PRBS generator 120 generates a sequence of pseudorandom bits (e.g., a pseudorandom data stream), and the BER analyzer 160 receives the data stream transmitted by the PRBS generator 120. In the embodiment, a noise waveform adjusted by scaling based on the SNR of the magnetic head calculated according to the noise characteristic curve measured by the measuring device 110 is also be constructed, and is injected into the receiver module 142 of the model 140 by the noise injection module 150. Thus the BER analyzer 160 also receives the data stream from the output of the receiver module 142 with the noise waveform is injected, and compares the data steam received directly from the PRBS generator 120, with the data stream received from the receiver module 142. Based on the comparison, the BER analyzer 160 determines the actual bit error occurred during the simulation with the enhanced noise based on the SNR of the magnetic head. For example, the BER analyzer 160 determines a number of bits that have errors (by comparing the bits received from the receiver module 142 and the bits received directly from the PRBS generator 120), and determines the BER by determining a ratio of the number of bits that have errors and the total number of the bits transmitted.

Figure 2:
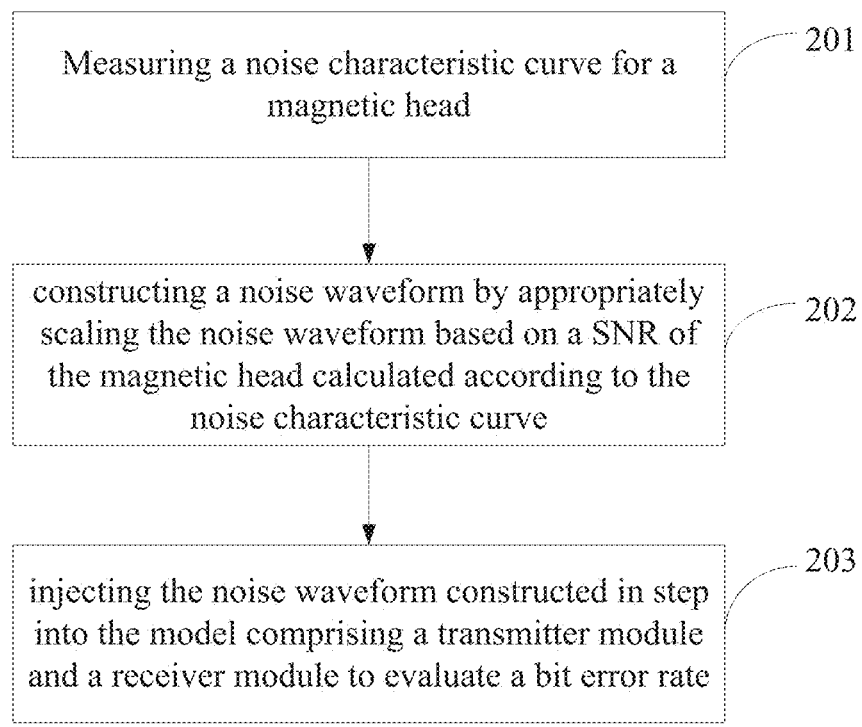
FIG. 2 is a simplified flowchart of a method for evaluating bit error rate in a magnetic head according to one embodiment of the present invention.

FIG. 2 illustrates an example method for evaluating bit error rate in a magnetic head according to one embodiment of the present invention. As shown in FIG. 2, the method includes the following steps.

Figure 3A:
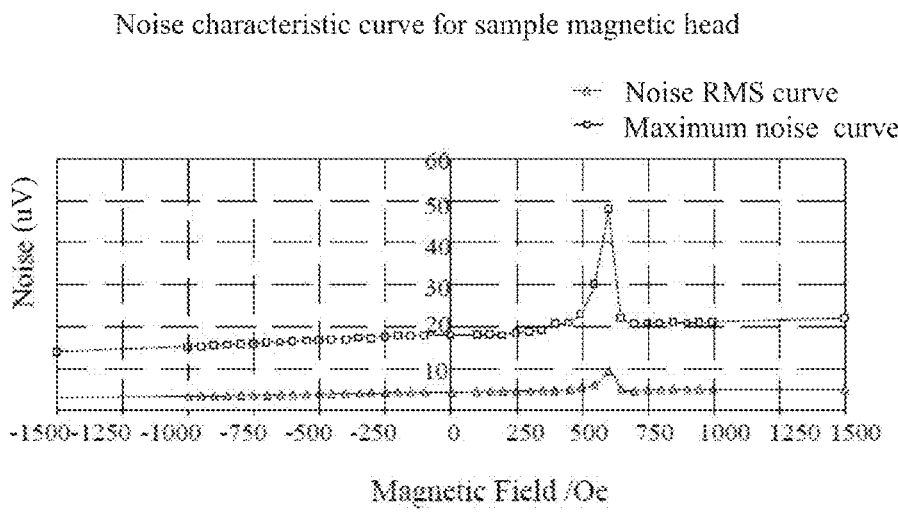
FIGS. 3a-3d show a testing example of the method according to the present invention.

Step 201, measuring a noise characteristic curve for a magnetic head. In this embodiment, the noise characteristic curve measured includes noise amplitude curve, maximum noise amplitude curve, and noise RMS curve for example, by which SNR of the tested magnetic head can be evaluated therefrom. FIG. 3a shows a test sample for one type of magnetic head which shows its noise characteristic curve. From the test result, it can be calculated that, the SNR for this sample is equal to 12.34. It should be noted that, the calculation manner for the SNR is well known to persons ordinarily skilled in the art, which is not described here in details.

Step 202, constructing a noise waveform by appropriately scaling the noise waveform based on a SNR of the magnetic head calculated according to the noise characteristic curve measured in step 201.

Figures 3B, 3C:
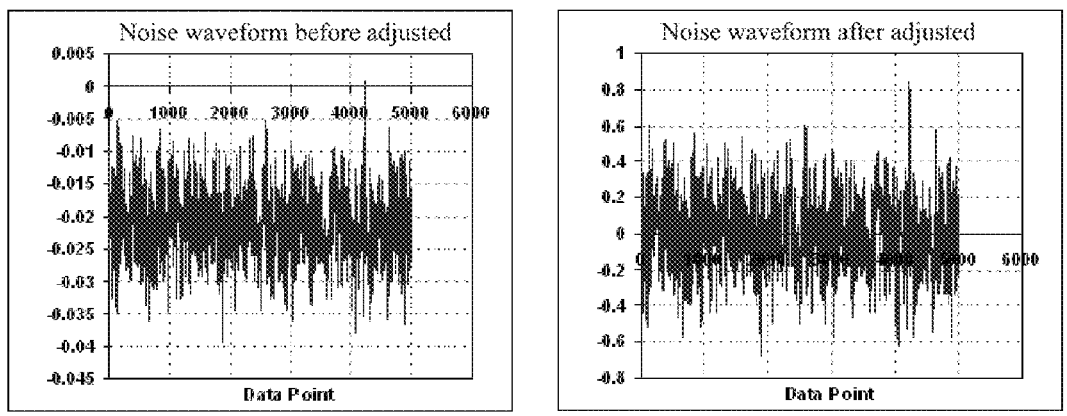

Specifically, the step 202 further includes capturing and normalizing an initiate noise waveform of the magnetic head with the DSO 121, as shown in FIG. 3b; and adjusting the initiate noise waveform by scaling the SNR of the magnetic head based on the noise characteristic curve, to obtain the noise waveform. In an embodiment, the noise waveform is generated by the DSO 121 and then converted by the AWG 122 to obtain a pseudorandom sequence of binary bits of data. And then, the a pseudorandom sequence of binary bits of data is enhanced by scaling based on a signal noise ratio of the magnetic head calculated from the noise characteristic curve, and the scaling for the noised waveform is calculated according to the equation below:

$$\text{Target\_Amp} = \frac{\text{Model\_Data\_Amp}}{SNR} \times \text{Optimization\_Gain},$$

and the target_Amp designates the amplitude of the target noise waveform, the Model_Data_Amp designates the amplitude of the model, the Optimization_Gain designates a constant. Commonly, the amplitude of the model is fixed for the specific machine, for example, in this embodiment the Module_Data_Amp=330 mV; and the Optimization_Gain is a constant, such as is equal to 12 in this embodiment. Therefore, $$\text{Target\_Amp} = \frac{\text{Model\_Data\_Amp}}{SNR} \times \text{Optimization\_Gain} = \frac{330}{12.34} \times 12 = 320 \text{ mV}.$$

Thus the noise waveform after adjustment is shown as FIG. 3c.

Step 203, injecting the noise waveform constructed in step 202 into the model 140 comprising a transmitter module 141 and a receiver module 142 to evaluate a bit error rate.

The step 203 further includes simulating an operation of the model 140 by injecting the noise waveform into the model; determining actual bit errors of the model when the model is simulated with the noise waveform; and evaluating the bit error rate based on the actual bit errors.

More specifically, the determining the actual bit errors includes receiving a pseudorandom binary sequence of data generated by the DSO 121; receiving an output from the receiver module 142 of the model 140 into which the pseudorandom binary sequence of data and the noise waveform are injected; comparing the pseudorandom binary sequence of data and the output received from the receiver module 142; and determining the actual bit errors based on said comparing.

In an embodiment, simulating the operation of the model further includes receiving a pseudorandom binary sequence of data in the transmitter module 141 of the model 140; injecting the noise waveform into the model 140; and receiving the pseudorandom binary sequence of data, with the noise waveform, in the receiver module 142.

Figure 3D:
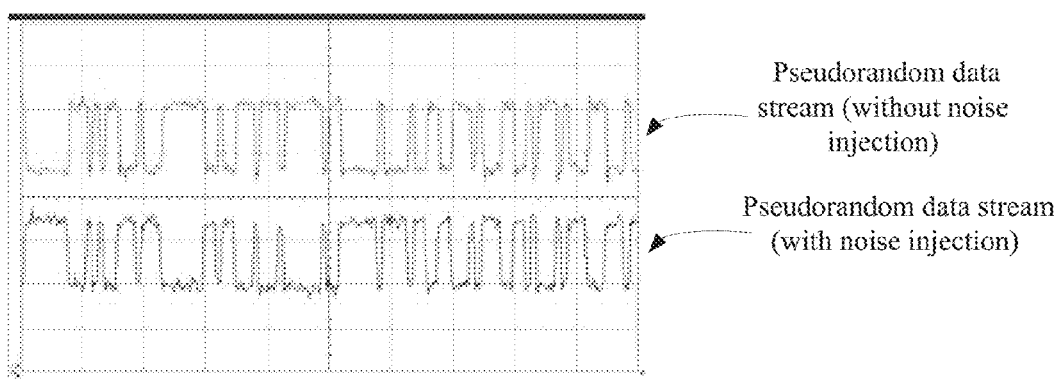

As an example, the upper pattern in FIG. 3d shows a sequence of pseudorandom bits (e.g., a pseudorandom data stream) received directly from the PRBS generator 120, and the lower pattern in FIG. 3d shows a data stream from the output of the receiver module 142 with the noise waveform of FIG. 3b is injected. By comparison with the two patterns, the BER analyzer 160 determines a number of bits that have errors (by comparing the bits received from the receiver module 142 and the bits received directly from the PRBS generator), and determines the BER by determining a ratio of the number of bits that have errors and the total number of the bits transmitted. Based on the BER result, the performance of the magnetic head can be judged, and the result accuracy is high.

In this disclosure, the BER testing tool including the model 140 and the BER analyzer 160 is combined with the QST tester, that is, the BER evaluation is performed in the QST system 100, which saves testing time and brings accurate testing result at the same time. Additionally, this testing method and system is also applicable to the row bar level, instead of testing the magnetic head one by one, which reduces manpower and improves the testing efficiency accordingly.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method for evaluating bit error rate for a magnetic head by using a quasi-static test system, comprising:

step (a), measuring a noise characteristic curve for a magnetic head, and the noise characteristic comprising noise amplitude and maximum noise amplitude;

step (b), constructing a noise waveform by appropriately scaling a signal noise ratio of the magnetic head based on the noise characteristic curve measured in step (a); and step (c), injecting the noise waveform constructed in step (b) into a model comprising a transmitter module and a receiver module to evaluate a bit error rate.

2. The method according to claim 1, wherein the step (b) comprises:

capturing and normalizing an initiate noise waveform of the magnetic head with a digital storage oscilloscope; and adjusting the initiate noise waveform by scaling the signal noise ratio of the magnetic head based on the noise characteristic curve, to obtain the noise waveform.

3. The method according to claim 2, wherein the scaling for the noise waveform is calculated according to the equation below:

$$\text{Target\_Amp} = \frac{\text{Model\_Data\_Amp}}{SNR} \times \text{Optimization\_Gain},$$

wherein the Model_Data_Amp designates the amplitude of the model, the Optimization_Gain designates a constant.

4. The method according to claim 1, wherein the step (c) comprises:

simulating an operation of the model by injecting the noise waveform into the model;

determining actual bit errors of the model when the model is simulated with the noise waveform; and evaluating the bit error rate based on the actual bit errors.

5. The method according to claim 4, wherein said determining the actual bit errors further comprises:

receiving a pseudorandom binary sequence of data generated by a digital storage oscilloscope;

receiving an output from the receiver module of the model into which the pseudorandom binary sequence of data and the noise waveform are injected;

comparing the pseudorandom binary sequence of data and the output received from the receiver module; and determining the actual bit errors based on said comparing.

6. The method according to claim 4, wherein said simulating the operation of the model further comprises:

receiving a pseudorandom binary sequence of data in the transmitter module of the model;

injecting the noise waveform; and receiving the pseudorandom binary sequence of data, with the noise waveform, in the receiver module.

7. A quasi-static test system, comprising:

a measuring device configured to measure a noise characteristic curve for a magnetic head, and the noise characteristic comprising noise amplitude and maximum noise amplitude;

a noise waveform generator configured to construct a noise waveform;

an adjustment unit configured to adjust the noise waveform by appropriately scaling the noise waveform based on a signal noise ratio of the magnetic head calculated according to the noise characteristic curve;

a model comprising a transmitter module and a receiver module;

a noise injection module configured to inject the noise waveform into the model; and a bit error rate analyzer coupled with the model and configured to evaluate a bit error rate.

8. The system according to claim 7, wherein the noise waveform generator comprises a digital storage oscilloscope configured to capture and normalize an initiate noise waveform of the magnetic head, and the adjustment unit configured to adjust the initiate noised waveform by scaling the signal noise ratio of the magnetic head to obtain the noise waveform.

9. The system according to claim 8, wherein the scaling for the noise waveform is calculated according to the equation below:

$$\text{Target\_Amp} = \frac{\text{Model\_Data\_Amp}}{SNR} \times \text{Optimization\_Gain},$$

wherein the Model_Data_Amp designates the amplitude of the model, the Optimization_Gain designates a constant.

10. The system according to claim 7, wherein the bit error rate analyzer is further configured to simulate an operation of the model by injecting the noise waveform into the model; determine actual bit errors of the model when the model is simulated with the noise waveform; and evaluate the bit error rate based on the actual bit errors.

11. The system according to claim 7, wherein the bit error rate analyzer is further configured to receive a pseudorandom binary sequence of data, to receive an output from the receiver module into which the pseudorandom binary sequence of data and the noise waveform are injected, to compare the pseudorandom binary sequence of data and the output received from the receiver module, and to determine the actual bit errors based on the comparison.

\* \* \* \* \*